United States Patent [19]

Cros et al.

[11] Patent Number: 4,904,347
[45] Date of Patent: Feb. 27, 1990

[54] METHOD AND APPARATUS FOR DISTILLING LIQUID HYDROCARBON PRODUCTS

[75] Inventors: Pierre Cros; Christian Daumas, both of Paris, France

[73] Assignees: Spie Batignolles, Puteaux; Electricite de France, Paris, both of France

[21] Appl. No.: 134,036

[22] Filed: Dec. 17, 1987

[30] Foreign Application Priority Data

Dec. 19, 1986 [FR] France ............... 86 17816

[51] Int. Cl.$^4$ .............................. B01D 3/10
[52] U.S. Cl. ...................... 203/73; 159/6.1; 159/13.1; 159/DIG. 16; 196/114; 202/173; 202/176; 202/205; 202/254; 202/261; 202/262; 203/100; 203/DIG. 9; 208/356; 208/367
[58] Field of Search ............ 202/173, 176, 254, 261, 202/262, 205, 236; 203/73, 91, 89, 100, DIG. 9; 159/6.1, 13.1, 23, 49, DIG. 16, DIG. 42; 261/146; 196/104, 114, 116; 208/356, 367; 55/315; 406/173

[56] References Cited

U.S. PATENT DOCUMENTS

| | | | |
|---|---|---|---|
| 1,527,944 | 2/1925 | Wiggins | 208/365 |
| 1,658,322 | 2/1928 | Bernard | 208/360 |
| 1,699,379 | 1/1929 | Sperry | 208/177 |
| 1,852,205 | 4/1932 | Gernsecke | 208/359 |
| 1,886,142 | 11/1932 | Williams | 208/80 |
| 1,954,839 | 4/1934 | Youker | 208/354 |
| 2,229,209 | 1/1941 | Houghton | 208/366 |
| 2,751,334 | 6/1956 | Scott, Jr. | 208/7 |
| 2,843,534 | 7/1958 | Harper | 203/88 |
| 2,980,179 | 4/1961 | Campbell, Jr. | 159/47.3 |
| 3,234,118 | 6/1962 | Chen | 208/93 |
| 3,767,564 | 10/1973 | Youngblood et al. | 208/92 |
| 4,140,212 | 2/1979 | O'Blasay et al. | 196/114 |
| 4,174,273 | 11/1979 | Cros et al. | 208/364 |
| 4,297,202 | 10/1981 | Blaser | 208/54 |
| 4,394,219 | 7/1983 | Mix et al. | 203/1 |
| 4,411,769 | 10/1983 | Oldweiler | 208/54 |
| 4,708,785 | 11/1987 | Myers | 208/113 |

FOREIGN PATENT DOCUMENTS

| | | |
|---|---|---|
| 1282602 | 12/1961 | France . |
| 1591064 | 6/1970 | France . |
| 2323423 | 4/1977 | France . |
| 2357308 | 4/1979 | France . |
| 1548096 | 7/1979 | United Kingdom . |

Primary Examiner—Virginia Manoharan
Attorney, Agent, or Firm—Kenyon & Kenyon

[57] ABSTRACT

A liquid product (4) leaving a furnace (2) is introduced into a series of cyclone separators (5, 6, 7). The liquid product to be vaporized is introduced tangentially into the top portion (5a, 6a, 7a) of each cyclone to place the product into contact with a side wall (5b, 6b, 7b) of the cyclone. A gaseous phase (11, 12, 13) formed in each cyclone is collected in the central zone (8, 9, 10;) of the cyclone and is then introduced into a vacuum distillation column (3). The liquid phase obtained in each cyclone is collected at the bottom (5c, 6c, 7c) of the cyclone and then is introduced tangentially into the top (6a, 7a) of the following cyclone or, in the case of the last cyclone, is introduced directly into the vacuum distillation column (3). The side wall (5b, 6b, 7b) of each cyclone (5, 6, 7) is heated to a temperature near the maximum temperature allowable for avoiding all thermal deterioration of the product. The invention is particularly useful for processing the residue obtained from atmospheric distillation columns of crude petroleum refineries.

12 Claims, 2 Drawing Sheets

METHOD AND APPARATUS FOR DISTILLING LIQUID HYDROCARBON PRODUCTS

BACKGROUND OF THE INVENTION

1. Technical Field

The present invention relates to a process for distillation of thermo-sensitive liquid hydrocarbon products, in particular the residue drawn off from the bottom of an atmospheric distillation column of a crude petroleum refinery The invention relates equally to an apparatus for performing the process.

2. Background Art

In known crude petroleum refineries, the residue is drawn off at 320° to 350° C. from the bottom of an atmospheric distillation column and is delivered into a furnace where it is heated to a temperature of the order of 390° to 410° C. This temperature corresponds to the maximum allowable value that will avoid all thermal deterioration (e.g., coking).

The product leaving the furnace is delivered into a large diameter manifold (1 to 1.5 m) in which it partially vaporizes before being introduced into a vacuum distillation column having a diameter of the order of 6 meters, the pressure in the upper part of this column being maintained at about 20 mm of Hg. The product introduced into this column flash vaporizes into a zone where the pressure is of the order of 40 to 60 mm Hg.

The applicants presented themselves with the problem of vaporizing the largest possible portion of this residue so as to minimize the undistilled quantity of the residue. To achieve this, it is necessary to heat the residue to the highest possible temperature without triggering a thermal deterioration of the product at the minimum pressure in the vacuum distillation column.

Now, the furnace used to heat the residue already operates under limiting conditions with regard to cracking (temperature equal to 390° to 410° C., pressure of the order of 1 bar). Moreover, the transfer manifold actually used for transferring the product leaving the furnace into the vacuum distillation column and in which occurs a large part of the vaporization of the product by reducing the pressure from about 1 bar to about 0.2 bar, does not act either to heat the product or to separate the liquid and gaseous phases.

French Patent Document No. 2,323,423, assigned to SPIE-BATIGNOLLES, describes a process for heating the petroleum crude before its introduction into the atmospheric pressure distillation column of a petroleum refinery. This process uses a succession of steam heated exchanger separators in series. This succession of exchanger separators provides gaseous phases which are introduced at different levels into the atmospheric distillation column, thereby promoting distillation while avoiding unnecessary overheating of the product.

This process of heating by steam is not always adapted to the vacuum distillation of a petroleum and chemical product that is sensitive to thermal deterioration in view of the level of the temperatures involved.

SUMMARY OF THE INVENTION

The object of the present invention is to overcome the drawbacks of the above-described prior art by providing a process which permits greater vaporization of thermo-sensitive liquid hydrocarbon products, while avoiding their thermal deterioration and minimizing the quantity of undistilled residue.

According to the invention, a process for distilling thermo-sensitive liquid hydrocarbon products, in particular the residue drawn off from the bottom of an atmospheric distillation column of a crude petroleum refinery, including heating said products in a furnace having the maximum temperature allowable to avoid all thermal deterioration and then introducing the products into at least one vacuum distillation column, comprises:

introducing the liquid product leaving the furnace into a series of centrifugal separation stages in which the pressure is intermediate between atmospheric pressure and the pressure maintained inside the vacuum distillation column, said pressure decreasing successively in the separation stages;

conducting the liquid product into contact with a side wall in each stage of centrifugal separation and heating said wall to a temperature sufficient to vaporize a portion of said liquid, said temperature being close to the maximum allowable for avoiding all thermal deterioration of the product;

drawing the vapor phase formed in each separation stage through a central zone of the stage and then introducing said vapor into a vacuum distillation column;

introducing the liquid phase obtained from each stage into the following separation stage and any liquid from the final separation stage directly into the vacuum distillation column.

By this process, the product is separated in each separation stage into a liquid phase which is sent to the following separation stage and a vapor phase which is sent directly into a vacuum distillation column.

Because of these successive separation stages in which the decreasing pressures are intermediate between atmospheric pressure and the pressure maintained inside the vacuum distillation column, and because of the heating of the liquid phase in each stage, the process according to the invention permits increased vaporization of the petroleum or chemical product and thus increased recovery of the distilled products.

As a matter of fact, the increasingly heavy liquid phases, difficult to vaporize, are heated at decreasing pressures. The heat flow can be controlled for each liquid phase to an optimum value for vaporization while at the same time avoiding all risk of thermal deterioration.

According to a preferred embodiment of the invention, the vapor phases obtained in the separation stages are introduced into the vacuum distillation column at different levels of the column. This procedure enhances the distillation in the vacuum column.

According to another aspect of the invention, an apparatus for distilling thermo-sensitive liquid hydrocarbon products, in particular the residue drawn from the bottom of an atmospheric pressure distillation column of a crude petroleum refinery, including a furnace in which these products are heated to the maximum temperature allowable for avoiding all thermal deterioration of the products and a vacuum distillation column connected to the furnace, comprises:

a series of centrifugal separators connecting the furnace to the vacuum distillation column, the pressure in said separators being intermediate between atmospheric pressure and the pressure maintained inside the vacuum distillation column, said pressure decreasing successively in the separators;

each separator including a feed inlet for product to be vaporized, the inlet being arranged to place said product into contact with a side wall of the separator;

each separator including a conduit for drawing off, in a central zone of the separator, a vapor phase formed in the respective separator, said conduit being connected to the vacuum distillation column;

each separator including a conduit connecting the bottom part of the separator to the feed inlet of the following separator or, in the case of the final separator, directly to the vacuum distillation column; and means for heating the side wall of each separator to a temperature close to the maximum temperature allowable for avoiding all thermal deterioration of the product.

BRIEF DESCRIPTION OF THE DRAWINGS

In the accompanying drawings, provided by way of example and without limitation.

DETAILED DESCRIPTION OF THE PREFERRED EMBODIMENT

Figure 1:
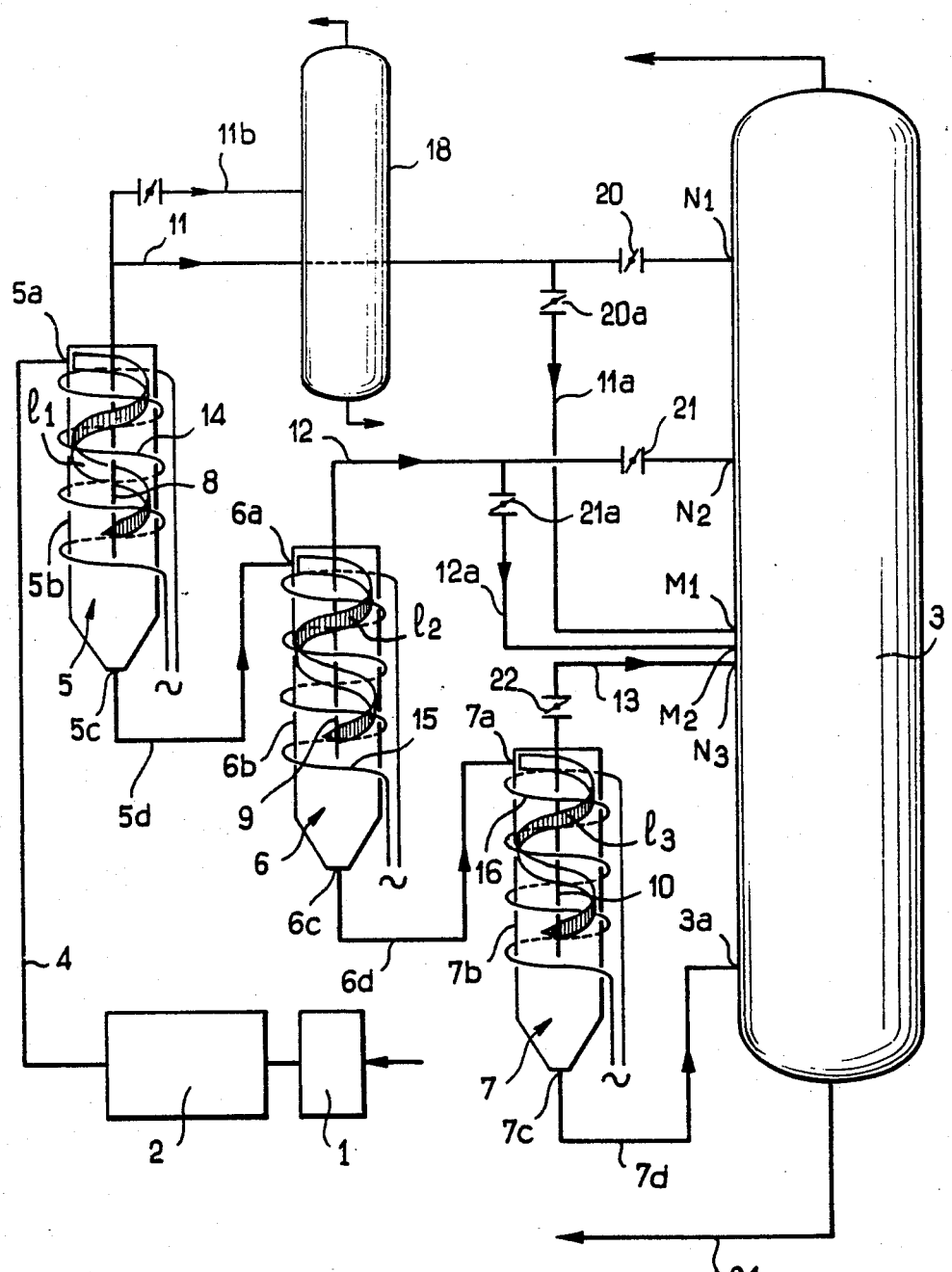
FIG. 1 is a schematic view of an apparatus according to the invention.

With reference to FIG. 1, in the distillation process, the residue drawn from the bottom of an atmospheric distillation column 1 of a crude petroleum refinery is heated in a furnace 2 to the maximum temperature (about 390° C. to 420° C.) allowable for avoiding thermal deterioration of the product.

According to the invention, before entering a vacuum distillation column 3 (20 to 60 mm Hg), the product 4 leaving the furnace is introduced into a series of cyclone separators 5, 6, 7 in which the pressure is intermediate between atmospheric pressure and the pressure maintained in the vacuum distillation column 3, this pressure decreasing progressively in the successive cyclones 5, 6, 7, between atmospheric pressure and about 60 mm Hg. The product 4 to be vaporized is introduced tangentially at the upper inlet 5a, 6a, 7a of each cyclone 5, 6, 7 to put this product in contact with a side wall 5b, 6b, 7b of each cyclone, the product following helical paths $l_1$, $l_2$, $l_3$, directed toward the bottom of the respective separators.

The gaseous phase 11, 12, 13 formed in each cyclone 5, 6, 7 is collected in the central zone 8, 9, 10 of the cyclone and is introduced directly into the vacuum distillation column 3 through conduits 11, 12, 13 at decreasing levels $N_1$, $N_2$, $N_3$. The conduits 11, 12, 13 preferably include devices (not shown) such as filter screens to prevent the entrainment of droplets of liquid.

The liquid phase obtained in the cyclones flows through a lower outlet 5c, 6c, 7c of successive cyclones and then is introduced either tangentially into the upper part 6a, 7a of the following cyclone or, in the case of the last cyclone 7, directly into the distillation column 3.

In addition, the side wall 5b, 6b, 7b of each cyclone 5, 6, 7 is heated to a temperature near the maximum temperature allowable for avoiding thermal deterioration of the product.

The liquid phase conduit 5d, 6d which connects each cyclone to the following one is formed in a way to provide a liquid seal that acts to maintain the pressure differences between the cyclones 5, 6, 7.

Figure 2:
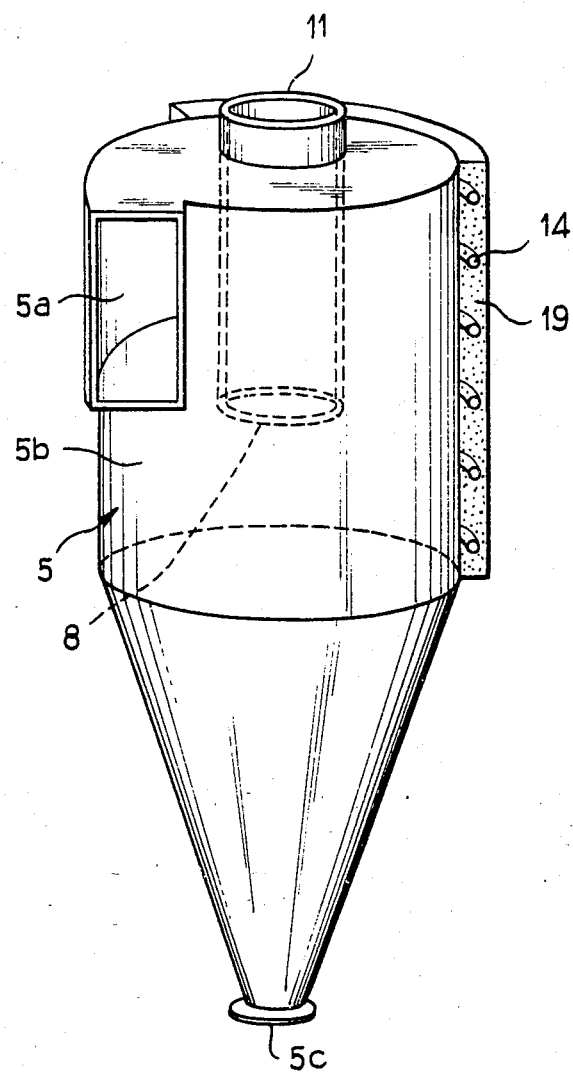
FIG. 2 is a perspective view, with the exterior heating jacket cut away, of a centrifugal separator of the apparatus according to the invention.

As shown in FIG. 1 and in particular in FIG. 2, a means for heating the side wall 5b, 6b, 7b of each cyclone comprises an electrical resistance 14, 15, 16 wound around said wall and embedded in a coating 19 of electrically and thermally insulating material. This electrical resistance is connected to control means that permit accurate adjustment of the heat flux, and thus the temperature of the walls 5b, 6b, and 7b.

As shown also in FIG. 2, the tangential inlet, such as 5a, of the cyclones has a large cross-section to limit pressure loss.

The conduit 11, 12, 13 for drawing the gaseous phase in each cyclone 5, 6, 7 and connected to the vacuum distillation column 3, includes a branch line 11a, 12a connected to that column at a height $M_1$, $M_2$ below the corresponding connection $N_1$, $N_2$ of the main part of that conduit.

Gates 20, 20a, 21, 21a, 22 placed on the conduits 11, 11a, 12, 12a and 13 control the outflow of vapor in these conduits and the pressure in the interior of the cyclones.

As also seen in FIG. 1, the conduit 11 connected to the vapor outlet of the first cyclone 5 includes a branch 11b permitting transfer of a part of or the total vapor flow into a small distillation column 18 maintained at a pressure substantially equal to that in the first cyclone 5.

The principal advantages of the process and the apparatus which have been described are the following:

The successive cyclones 5, 6, 7 replace the conventional transfer line which directly connects the furnace 2 to the vacuum distillation column 3. This substitution thus does not require any major modification of the conventional installation. Since in each cyclone 5, 6, 7 the product flows along the side wall of the column in the form of a thin layer, excellent heat transfer is obtained between the external resistances 14, 15, 16 and this film. Because the heat flux through the side walls 5a, 6a, 7a of the cyclones can be controlled with very great precision (of the order of $1W/cm^2$), the corresponding temperature can be maintained close to the maximum value allowable for avoiding thermal deterioration under the conditions maintained in the different cyclones. The heat flux to the liquid phase can be different in each cyclone and can be adapted to the thermal stability of the different liquid phases.

The decreasing pressures existing in the successive cyclones 5, 6, 7 can be obtained by means of the liquid seals 5d, 6d, 7d formed at the lower part of each of these cyclones.

The gaseous phases collected in the respective central zones 8, 9, 10 of the cyclones have increasing densities. They can thus be introduced into the column 3 at decreasing heights, which improves the distillation.

In the embodiment shown in FIG. 1, part of or the total vapor flow carrying a large proportion of non-condensable gases such as nitrogen, methane or ethane leaving the first cyclone 5 is sent into the small distillation column 18 instead of going directly into the column 3. Drawing off the non-condensable gases thus facilitates obtaining a low pressure in the column 3, which can only improve the efficiency of the overall operation. As a result of all the above described arrangements, a very large part of the crude petroleum residue is vaporized and the quantity of non-distilled residue is diminished, this latter being recovered at the lower part 24 of the column 3.

A detailed working example of the invention is given below.

Approximately 200 metric tons/h of residue at 350° C. is drawn from the bottom of the atmospheric distillation column 1 and is pumped into the furnace 2 where it is heated to 400°–420° C. At the outlet of the furnace 2, the pressure is of the order of 1 bar. The internal pressures in cyclones 5, 6, 7 are equal respectively to 700, 400, and 100 mm Hg.

The cyclones 5, 6, 7 have, for example, a diameter equal to 2 m and a height equal to 8 m. They have an exterior surface area equal to 50 m$^2$ heated by means of an electrical resistance or by induction. The heat flux is limited to 1W cm$^2$ to avoid thermal deterioration. The total heating power per cyclone is thus equal to 500 kW.

The total increase of vaporized product can reach in this example 5 to 10% by weight of the residue drawn from the bottom of the atmospheric distillation column, being 2.5 to 5% of the crude petroleum fed into this column.

Now each percent of additional distilled crude petroleum represents an increase of 3.50 to 7.00 F ($0.60 to $1.20) per metric ton at current prices. Thus, for one crude petroleum treatment unit of 4 million metric tons per year capacity, each additional percent of distilled crude petroleum represents an increased value of 14–28 MF ($2.4M to $4.8M) per year.

Taking into account the electrical consumption, which is at maximum 300 KWh/metric ton, and the cost of the necessary investment for the additional apparatus, the time for return of the investment is less than one year.

It will be understood that the invention is not limited to the embodiment which has been described, and a person skilled in the art can add numerous modifications within the scope of the invention.

Furthermore, the conventional cyclones 5, 6, 7 can be replaced by phase separation apparatuses as described in French Patent No. 76 20526 of Jul. 5, 1976, which provide even better performance.

It will also be understood that the invention can be applied to the distillation of all thermo-sensitive liquid products other than the residues of an atmospheric distillation column of a petroleum refinery.

Moreover, other means than the liquid seals 5d, 6d, and 7d can be used to maintain the predetermined pressure differences between the different cyclones or separators.

We claim:

1. In a process for distilling a residue drawn from the bottom of an atmospheric distillation column of a crude oil refinery, the process including heating the residue in a furnace to a maximum temperature allowable for avoiding thermal deterioration of the residue and then introducing said residue into at least one vacuum distillation column, wherein the improvement comprises:
   passing the liquid residue leaving the furnace through at least one cyclonic separator, the pressure in said at least one cyclonic separator being intermediate between atmospheric pressure and the pressure inside the at least one vacuum distillation column,
   conducting said liquid residue into contact with a side wall of said cyclonic separator in a thin film and heating said side wall to a temperature sufficient to partially vaporize the liquid residue, said temperature being close to the maximum value allowable for avoiding thermal deterioration of the liquid residue;
   withdrawing the vapor phase formed from the heated liquid residue in a central zone of said separator and then introducing said vapor phase into said at least one vacuum distillation column; and
   taking a remaining liquid phase of the residue from said separator and introducing said remaining liquid phase into said vacuum distillation column, wherein
   the vapor phase formed in said cyclonic separator is introduced into said at least one vacuum distillation column at a level which is higher than the level of introduction of said remaining liquid phase onto said at least one vacuum distillation column.

2. A process according to claim 1, wherein the temperature prevailing inside the furnace is between 390° and 420° C., the pressure inside the at least one vacuum distillation column is between 20 and 60 mm Hg, and the pressure inside the at least one cyclonic separator is between atmospheric pressure and about 60 mm Hg.

3. A process according to claim 1, wherein said at least one cyclonic separator comprises a plurality of cyclonic separators connected to each other in series and wherein the vapor phases withdrawn from said successive cyclonic separators are introduced into the at least one vacuum distillation column at levels which decrease in the order of succession of the cyclonic separators between the furnace and the at least one vacuum distillation column.

4. A process according to claim 3 wherein the temperature prevailing inside the furnace is between 390° and 420° C., the pressure inside the at least one vacuum distillation column is between 20 pk and 60 mm Hg, and the pressures inside the plurality of cyclonic separators connected in series decrease successively in the range between atmospheric pressure and about 60 mm Hg.

5. A process according to claim 4 wherein the successively decreasing pressures in the successive cyclonic separators connected in series are maintained by a liquid seal between each successive cyclonic separator.

6. In an apparatus for distilling residue drawn from the bottom of an atmospheric distillation column of a crude oil refinery, the apparatus including a furnace in which said residue is heated to a maximum temperature allowable for avoiding thermal deterioration of the residue, a vacuum distillation column and means connecting the vacuum distillation column to the furnace, wherein the improvement comprises:
   at least one cyclonic separator, the pressure in said at least one cyclonic separator being intermediate between atmospheric pressure and the pressure maintained inside the vacuum distillation column,
   said at least one cyclonic separator including a feed inlet coupled to the furnace for receiving a residue to be vaporized, the inlet being arranged to place said residue into contact with a side wall of the at least one cyclonic separtor;
   said at least one cyclonic separator including a conduit for collecting, in a central zone of the at least one cyclonic separator, a vapor phase formed in the at least one cyclonic separator;
   a conduit connecting the bottom part of the at least one cyclonic separator to the vacuum distillation column for introducing a remaining liquid phase of the residue into the column;
   means for heating the side wall of said at least one cyclonic separator to a temperature close to the maximum temperature allowable for avoiding thermal deterioration of the residue; and
   means for introducing into said vacuum distillation column at least a part of the vapor phase formed in said at least one cyclonic separator at a level of said column which is higher than the level of introduction of said liquid phase into said column; and wherein the at least one cyclonic separator comprises a plurality of cyclonic separators connected to each other, and wherein the means for connecting the conduit of the vapor phase in each cyclonic separator to the vacuum column comprises a main line directly connecting each vapor phase conduit to the vacuum column.

7. An apparatus according to claim 6, wherein the means for heating the side wall of said cyclone comprises electrical resistance heaters.

8. In an apparatus for distilling residue drawn from the bottom of an atmospheric distillation column of a crude oil refinery, the apparatus including a furnace in which said residue is heated to a maximum temperature allowable for avoiding thermal deterioration of the residue, and a vacuum distillation column connected to the furnace, wherein the improvement comprises:

at least one cyclonic separator, the pressure in said at least one cyclonic separator being intermediate between atmospheric pressure and the pressure maintained inside the vacuum distillation column, said at least one cyclonic separator including a feed inlet coupled to the furnace for receiving a residue to be vaporized, the inlet being arranged to place said residue into contact with a side wall of the at least one cyclonic separator;

said at least one cyclonic separator including a conduit for collecting, in a central zone of the at least one cyclonic separator, a vapor phase formed in the at least one cyclonic separator;

a conduit connecting the bottom part of the at least one cyclonic separator to the vacuum distillation column for introducing a remaining liquid phase of the residue into the column;

means for heating the side wall of said at least one cyclonic separator to a temperature close to the maximum temperature allowable for avoiding thermal deterioration of the residue; and means for introducing into said vacuum distillation column at least a part of the vapor phase formed in said cyclonic separator at a level of said column which is higher than the level of introduction of said liquid phase into said column; and wherein the at least one cyclonic separator comprises a plurality of cyclonic separators connected to each other, and wherein the means for connecting the conduit for the vapor phase in each cyclonic separator to the vacuum distillation column comprises a main line directly connecting the vapor phase conduit in each cyclonic separator to the vacuum distillation column, and, for at least some of the separators, a branch line connecting the vapor phase conduit in each cyclonic separator to said column at a height below the column connection of the main line from said vapor phase conduit.

9. An apparatus according to claim 8, further comprising an additional branch line for conveying at least a portion of the vapors from the conduit for collecting the vapor phase of at least one of the cyclonic separators to an additional distillation column wherein the pressure is maintained substantially equal to that of the one cyclonic separator.

10. An apparatus according to claim 9, further comprising a liquid phase conduit which connected each separator to the following one, said liquid phase conduit having an intermediate portion located below its connections to the separators so as to provide a liquid seal acting to maintain pressure differences between the separators.

11. In an apparatus for distilling residue drawn from the bottom of an atmospheric distillation column of a crude oil refinery, the apparatus including a furnace in which said residue is heated to a maximum temperature allowable for avoiding thermal deterioration of the residue, a vacuum distillation column and means for coupling the vacuum distillation column to the furnace for receiving said residue, wherein the improvement comprises a plurality of cyclonic separators connected to each other in series, the pressures inside the plurality of cyclonic separators decreasing successively in the range between atmospheric pressure and the pressure maintained in the vacuum distillation column, each of said cyclonic separators including a feed inlet, the feed inlet of a first cyclonic separator in the series of cyclonic separators being connected to the furnace for receiving the residue to be vaporized, the inlet being arranged to place said residue in contact with a side wall of the cyclonic separator, each of said cyclonic separators including a conduit for collecting, in a central zone of the cyclonic separator, a vapor phase formed on the cyclonic separator, said conduit having a vapor outlet, and each of said cyclonic separators including a liquid outlet at the bottom of the cyclonic separator, the liquid outlet of each cyclonic separator except the last in the series of cyclonic separators being connected to the feed inlet of the next cyclonic separator in the series;

means for heating the side wall of each of the plurality of cyclonic separators to a temperature close to the maximum temperature allowable at the pressure maintained in the cyclonic separator for avoiding thermal deterioration of the residue;

means for connecting the vapor outlets of the successive plurality of cyclonic separators directly to successively lower levels of the vacuum distillation column; and means for connecting the liquid outlet of the last cyclonic separator to the vacuum distillation column below the lowest connection level of the vapor outlets of the plurality of cyclonic separators.

12. An apparatus according to claim 11 wherein the connection of each liquid outlet of each separator except the last in the series of separators to the feed inlet of the next separator in the series includes a liquid seal to maintain the pressure differences between the separators.

* * * * *

UNITED STATES PATENT AND TRADEMARK OFFICE
CERTIFICATE OF CORRECTION

PATENT NO. : 4,904,347

DATED : February 27, 1990

INVENTOR(S) : Cros et al.

It is certified that error appears in the above-identified patent and that said Letters Patent is hereby corrected as shown below:

TITLE PAGE:

Abstract, line 7, change: "10;" to --10--.

Abstract, line 13, change: "vacauum" to --vacuum--.

Column 1, line 12, change: "refinery" to --refinery.--.

Column 8, line 5, change: "connected" to --connects--.

Signed and Sealed this

Twenty-third Day of April, 1991

Attest:

HARRY F. MANBECK, JR.

*Attesting Officer*  *Commissioner of Patents and Trademarks*